(12) United States Patent
Kato et al.

(10) Patent No.: US 11,385,615 B2
(45) Date of Patent: Jul. 12, 2022

(54) CONTROL DATA GENERATION DEVICE, CONTROL DATA GENERATION METHOD, AND STORAGE MEDIUM

(71) Applicant: Mitsubishi Electric Corporation, Tokyo (JP)

(72) Inventors: Hidehito Kato, Tokyo (JP); Masamitsu Hattori, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/415,724

(22) PCT Filed: Feb. 7, 2019

(86) PCT No.: PCT/JP2019/004482
§ 371 (c)(1),
(2) Date: Jun. 18, 2021

(87) PCT Pub. No.: WO2020/161870
PCT Pub. Date: Aug. 13, 2020

(65) Prior Publication Data
US 2022/0043417 A1 Feb. 10, 2022

(51) Int. Cl.
*G05B 19/402* (2006.01)
*G05B 19/4097* (2006.01)
*G06F 3/14* (2006.01)

(52) U.S. Cl.
CPC ....... *G05B 19/402* (2013.01); *G05B 19/4097* (2013.01); *G06F 3/14* (2013.01);
(Continued)

(58) Field of Classification Search
None
See application file for complete search history.

(56) References Cited

U.S. PATENT DOCUMENTS

2003/0187542 A1 10/2003 Endo et al.
2004/0100218 A1 5/2004 Fujinawa
(Continued)

FOREIGN PATENT DOCUMENTS

JP 2004-1179 A 1/2004
JP 2012-194664 A 10/2012
(Continued)

OTHER PUBLICATIONS

International Search Report and Written Opinion dated Apr. 9, 2019, received for PCT Application PCT/JP2019/004482, Filed on Feb. 7, 2019, 8 pages including English Translation.
(Continued)

*Primary Examiner* — Sean Shechtman
(74) *Attorney, Agent, or Firm* — Xsensus LLP

(57) ABSTRACT

A control data generation device includes a computation unit calculating a control command based on rotational information or temporal information. The rotational information specifies a relationship between a specific rotation angle or specific rotational position during one spindle revolution and a position of the driven device. The temporal information specifies a relationship between a specific elapsed time during one spindle revolution and the position of the driven device. It also includes a display control unit controlling displaying the control command. Upon reception of an order to display temporal information during displaying rotational information, the rotational information is converted into the temporal information, and the obtained temporal information is displayed on the display device. Upon reception of an order to display rotational information during displaying temporal information, the computation unit converts the temporal information into the rotational information, and displays the rotational information obtained by the conversion.

13 Claims, 8 Drawing Sheets

(52) U.S. Cl.
CPC .............. *G05B 2219/35012* (2013.01); *G05B 2219/50156* (2013.01)

(56) References Cited

U.S. PATENT DOCUMENTS

| | | |
|---|---|---|
| 2014/0058565 A1 | 2/2014 | Shimamura et al. |
| 2017/0153626 A1 | 6/2017 | Oonishi |
| 2019/0324425 A1* | 10/2019 | Oho .................. G05B 19/4068 |

FOREIGN PATENT DOCUMENTS

| | | |
|---|---|---|
| JP | 2017-102509 A | 6/2017 |
| WO | 2002/091089 A1 | 11/2002 |
| WO | 2018/154745 A1 | 8/2018 |

OTHER PUBLICATIONS

Decision to Grant dated Jul. 16, 2019, received for JP Application 2019-531349, 5 pages including English translation.

* cited by examiner

CONTROL DATA GENERATION DEVICE, CONTROL DATA GENERATION METHOD, AND STORAGE MEDIUM

CROSS-REFERENCE TO RELATED APPLICATION

The present application is based on PCT filing PCT/JP2019/004482, filed Feb. 7, 2019, the entire contents of which are incorporated herein by reference.

FIELD

The present invention relates to a control data generation device, control data generation method, and a control data generation program, based on each of which a control command for providing positioning control of a driven device is generated.

BACKGROUND

A drive device such as a servomotor causes a driven device such as a rotary table to operate periodically. To periodically drive a driven device according to the rotational operation of a main spindle that is a rotation axis, a waveform is generated that represents the correspondence relationship between a rotation angle during one revolution of the main spindle and an operation position of the driven device, and the drive device drives the driven device according to the waveform.

The control device described in Patent Literature 1 has a configuration prepared with cam-based data that commands a moving position as a function of the amount of cam rotation, and time-based data that commands a moving position as a function of the elapsed time, in which the cam-based and the time-based data are preset data of a moving position of the cam. This control device performs a step based on the cam-based data and a step based on the time-based data in combination in a sequence of machining programs.

CITATION LIST

Patent Literature

Patent Literature 1: WO 2002/091089 A

SUMMARY

Technical Problem

However, in the technique of Patent Literature 1 listed above, the cam-based data is edited based on the amount of cam rotation and the time-based data is edited based on the elapsed time. Therefore, the cam-based data could not be edited based on the elapsed time, and the time-based data could not be edited based on the amount of cam rotation. For example, if the cam-based data needs to be edited based on the elapsed time, the process has to be taken such that a user converts the cam-based data into time-based data using a computer or the like, thereupon edits the time-based data based on the elapsed time, and reconverts the edited time-based data into cam-based data. Similarly, if the time-based data needs to be edited based on the amount of cam rotation, the process has to be taken such that the user converts the time-based data into cam-based data using a computer or the like, thereupon edits the cam-based data based on the elapsed time, and reconverts the edited cam-based data into time-based data. In this manner, a problem has existed in that a laborious operation of editing a control command for positioning control on a cam.

The present invention has been made in view of the foregoing circumstances, and it is an object of the present invention to provide a control data generation device, a control data generation method, and a control data generation program each of which enables a control command for positioning control on a driven device to be easily edited.

Solution to Problem

In order to solve the above-mentioned problems and achieve the object, the present invention provides a control data generation device for generating a control command for providing positioning control of a driven device to be driven by a drive device to a position corresponding to a periodic operation of a main shaft that is a rotation axis, the control data generation device comprising: an input unit to receive at least one of rotational information and temporal information, the rotation information having specified therein a correspondence relationship between a specific rotation angle or a specific rotational position during one revolution of the main shaft and a position of the driven device, the temporal information having specified therein a correspondence relationship between a specific elapsed time during one revolution of the main shaft and the position of the driven device; a computation unit to calculate the control command based on the rotational information or on the temporal information; and a display control unit to display the control command calculated by the computation unit on a display device, wherein in response to the input unit receiving an order to display the temporal information when the display device is displaying the rotational information, the computation unit converts the rotational information into the temporal information, and the display control unit displays the temporal information obtained by the conversion on the display device, and in response to the input unit receiving an order to display the rotational information when the display device is displaying the temporal information, the computation unit converts the temporal information into the rotational information, and the display control unit displays the rotational information obtained by the conversion on the display device.

Advantageous Effects of Invention

A control data generation device according to the present invention provides an advantageous effect that a control command for positioning control on a driven device can be easily edited.

DESCRIPTION OF EMBODIMENTS

A control data generation device, a control data generation method, and a control data generation program according to an embodiment of the present invention will be described in detail below with reference to the drawings. Note that this embodiment is not intended to necessarily limit this invention.

Embodiment

Figure 1:
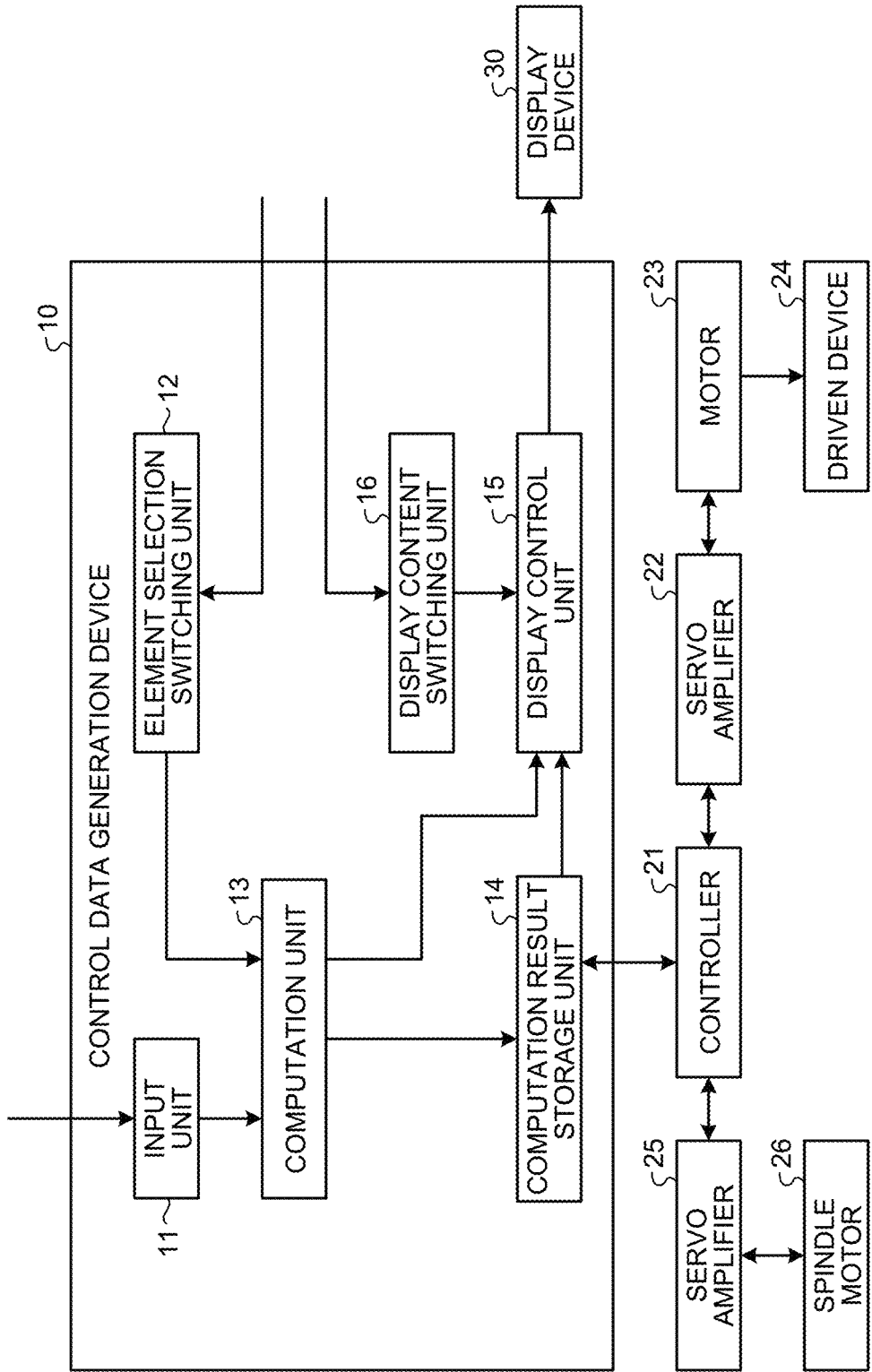
FIG. 1 is a diagram illustrating a configuration of a control data generation device according to an embodiment.
Figure 2:
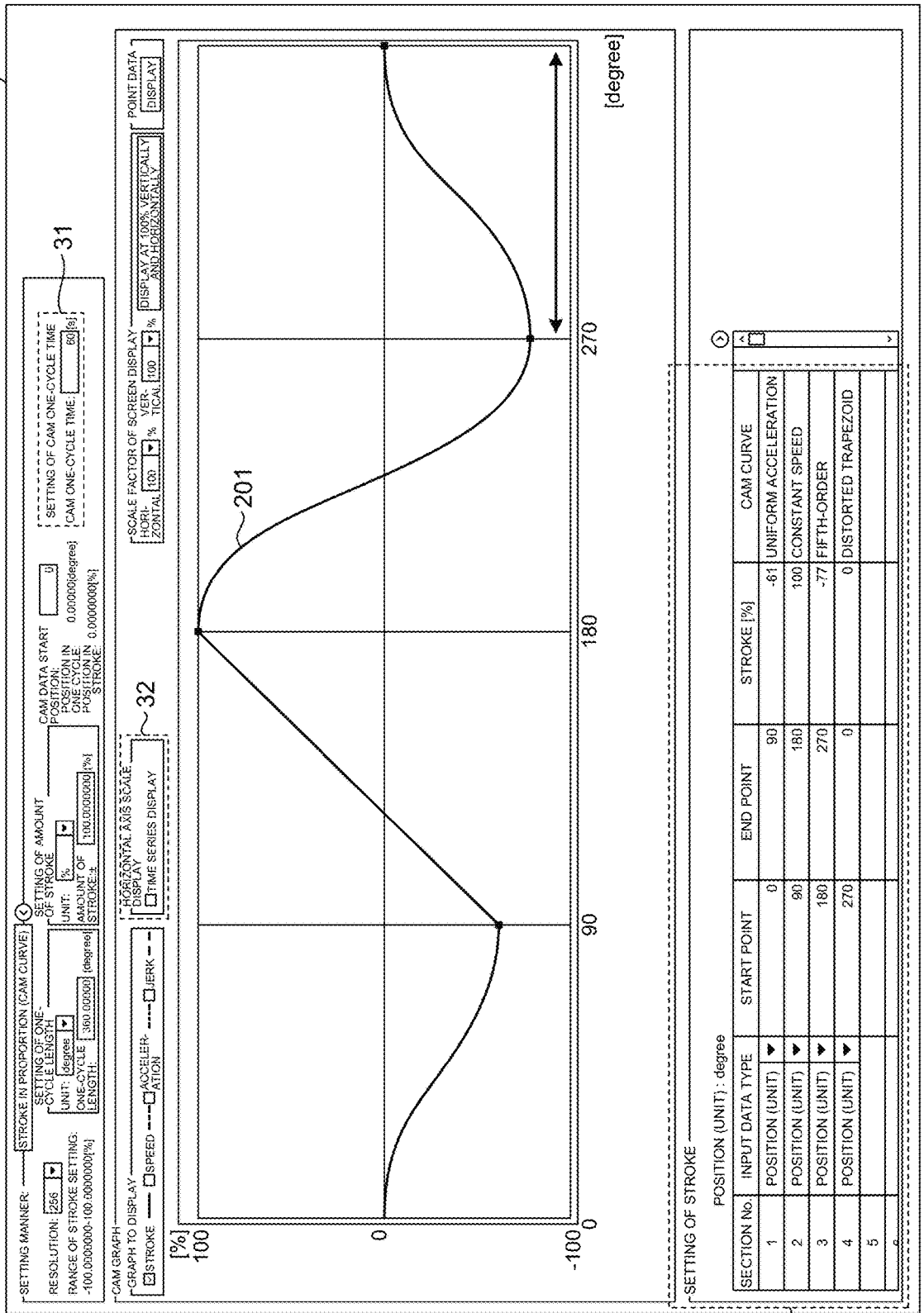
FIG. 2 is a diagram illustrating a first example of positioning control data displayed by the control data generation device according to the embodiment.

FIG. 1 is a diagram illustrating a configuration of a control data generation device according to an embodiment. FIG. 2 is a diagram illustrating a first example of positioning control data displayed by the control data generation device according to the embodiment. A control data generation device 10 refers to a computer that generates positioning control data that is a control command for providing control of positioning of a driven device 24 to a position corresponding to periodic operation of a main shaft that is a rotation axis. The control data generation device 10 has a function of assisting a user in generating the positioning control data. The control data generation device 10 is implemented using an engineering tool configured to generate the positioning control data.

The control data generation device 10 calculates positioning control data as a control command by which a position of the driven device 24 is specified. Examples of the driven device 24 include a wheeled platform and a turntable. The positioning control data is applied to a machine in which the driven device 24 connected to a slave shaft changes its position depending on rotation of the main shaft. Therefore, the positioning control data represents the position of the driven device 24 with respect to the position (i.e., rotation angle) of the main shaft.

The control data generation device 10 calculates a waveform of the positioning control data that represents a correspondence relationship between a rotation angle during one revolution of the main shaft and a position of the driven device 24, based on the position of the driven device 24 that has been set for each rotational position of the main shaft.

FIG. 2 illustrates a screen 101 that is in an initial state of a screen on which the positioning control data is to be displayed. In the screen 101, there are displayed a waveform 201 of the positioning control data, input fields 31 to 33 in which information pieces for generating the positioning control data are inputted, and so on. The screen 101 illustrated in FIG. 2 and screens 102 to 105 illustrated in FIGS. 4 to 7 described later each serve as a screen of an engineering tool configured to generate the positioning control data.

The control data generation device 10 includes an input unit 11, an element selection switching unit 12, a computation unit 13, a computation result storage unit 14, a display control unit 15, and a display content switching unit 16.

The control data generation device 10 is connected to a display device 30 and a controller 21. The display device 30 is a device configured to display the positioning control data generated by the control data generation device 10. An example of the display device 30 is a liquid crystal display monitor. The positioning control data is represented in the form of a waveform 201 with reference to a horizontal axis set as the rotation angle of the main shaft and a vertical axis set as the position of the driven device 24 such as a turntable.

The controller 21 is connected to a servo amplifier 25. The servo amplifier 25 is connected to a spindle motor 26. The controller 21 outputs, to the servo amplifier 25, a motor position command that is a position command for the spindle motor 26.

The servo amplifier 25 controls the spindle motor 26 according to the motor position command. The servo amplifier 25 compares the motor position command with a feedback value of the motor position sent from the spindle motor 26, and adjusts operational conditions (rotational speed of the spindle, torque of the spindle, etc.) of the spindle motor 26 to match the feedback value with a value corresponding to the motor position command.

The spindle motor 26 includes a spindle motor element and a main shaft. The spindle motor element of the spindle motor 26 rotates the main shaft of the spindle motor 26. In such a situation, a motor position command serves as information by which the rotation angle of the main shaft of the spindle motor 26 is specified.

The controller 21 is also connected to another servo amplifier 22. The servo amplifier 22 is connected to a motor 23. The motor 23 is connected to the driven device 24 such as a turntable. The controller 21 that is a commander device outputs a position command to the servo amplifier 22 using the motor position command sent to the servo amplifier 25 and the positioning control data generated by the control data generation device 10. The positioning control data is data in which an operational state of the main shaft and a position command for the driven device 24 are associated with each other. Therefore, the position command outputted by the controller 21 to the servo amplifier 22 is a command dependent on the operational state of the main shaft, that is, the motor position command (rotation angle of the spindle) sent to the servo amplifier 25). The operational state of the main shaft is represented by the rotation angle during one revolution of the spindle, or by the elapsed time during one revolution of the spindle. The position command in the positioning control data refers to a command by which the position of the driven device 24 is specified. The controller 21 extracts, from the positioning control data, the position command corresponding to the motor position command sent to the servo amplifier 25, and outputs the position command to the servo amplifier 22.

The servo amplifier 22 that is a control device controls the motor 23 according to the position command from the controller 21. The servo amplifier 22 compares the position command with a feedback value of the motor position sent from the motor 23, and adjusts operational conditions of the motor 23 to make the feedback value equal to a value corresponding to the position command. The motor 23 drives the driven device 24. The driven device 24 has a function for a driving force transmission device that moves an "object to be moved" such as a table or a wheel. For example, in a case in which the driven device 24 is a wheeled platform, the motor 23 drives the wheeled platform to thereby move a table.

Note that the operations of the servo amplifier 25 and the spindle motor 26 may be virtually calculated by the controller 21. In this case, there is no need to provide the servo amplifier 25 and the spindle motor 26. In addition, the servo amplifier 25 and the spindle motor 26 may be controlled by a controller other than the controller 21. In this case, the controller 21 outputs a position command to the servo amplifier 22 with use of a feedback value sent from the spindle motor 26 to the servo amplifier 25 and the positioning control data generated by the control data generation device 10.

The input unit 11 receives information entered by the user, and inputs the information into the computation unit 13. As the information inputted to the input unit 11 by the user, generation configuration information is used, which is information for generating the positioning control data. The generation configuration information includes a one-cycle time of the driven device 24 such as a turntable. The generation configuration information also includes rotational information in which a correspondence relationship between information on rotation during one revolution of the main shaft and the position of the driven device 24, or temporal information in which a correspondence relationship between a specific elapsed time during one revolution of the main shaft and the position of the driven device 24. That is, the user enters the rotational information or the temporal information into the input unit 11 to generate the positioning control data. The rotational information may be specified by the user using a specific rotation angle (in degrees) during one revolution of the main shaft, or by the user using a specific rotational position (in mm or inches) during one revolution of the main shaft, or the like. The specific rotation angle during one revolution of the main shaft represents an angle by which one-cycle action makes progress. The specific rotational position during one revolution of the main shaft represents a distance (length) by which one-cycle action makes progress. When the rotational information is specified, the unit (degree, inch, or the like) of the rotational information and a one-cycle length (angle or distance) are specified. The control data generation device 10 sets the rotation angle along the horizontal axis for the positioning control data in the case in which the rotational information is the rotation angle, and sets the rotational position along the horizontal axis of a graph depicting the positioning control data in the case in which the rotational information is the rotational position. The present embodiment will be described assuming that the rotational information is given by a specific rotation angle during one revolution of the main shaft. The temporal information is a specific time length during one revolution of the main shaft, which is specified by the user. The specific time length during one revolution of the main shaft represents the time by which a one-cycle action makes progress.

The input unit 11 receives the rotational information or the temporal information from the user for each section. The term "section" refers to each of divisions of a rotation angle or elapsed time for one revolution of the main shaft. In the case of use of the rotational information, the rotation angle for one revolution of the main shaft is divided into multiple angular ranges (specific rotation angles) according to an order from the user. In this case, each of the angular ranges corresponds to one section. In the case of use of the temporal information, the elapsed time for one revolution of the main shaft is divided into multiple time ranges (specific elapsed times) according to an order from the user. In this case, each of the time ranges corresponds to one section.

The rotation angle for one revolution of the main shaft is divided, according to an order from the user, into multiple sections, for example, a first section from 0 degrees to 90 degrees, a second section from 90 degrees to 180 degrees, a third section from 180 degrees to 270 degrees, and a fourth section from 270 degrees to 360 degrees of the rotation angle.

The elapsed time for one revolution of the main shaft is divided, according to an order from the user, into multiple sections, for example, a first section from 0 seconds to 15 seconds, a second section from 15 seconds to 30 seconds, a third section from 30 seconds to 45 seconds, and a fourth section from 45 seconds to 60 seconds of the elapsed time. The elapsed time is 0 seconds when the rotation angle of the main shaft is 0 degrees.

As described above, the rotation angle or the elapsed time for one revolution of the main shaft is divided into multiple sections according to an order from the user. The range of the rotation angle or the elapsed time in each section is set by the user entering a specific rotation angle that represents a section border or a specific elapsed time that represents a section border, in the input unit 11. The input unit 11 receives either one of the rotational information and the temporal information for one section. When a rotation angle is set for a section, the input unit 11 receives a rotation angle at the start point of the section and a rotation angle at the end point of the section. When an elapsed time is set for a section, the input unit 11 receives an elapsed time at the start point of the section and an elapsed time at the end point of the section.

The one-cycle time of the driven device 24 is a time length required for the main shaft to rotate one revolution. That is, the time for which the main shaft rotates one revolution is the same as the one-cycle time of the driven device 24. An example of the one-cycle time of the driven device 24 is a cam cycle time representing a time in which the turntable performs an operation for one cycle.

Examples of input fields displayed in the screen 101 include the input field 31 for entering the one-cycle time, the input field 33 for entering the rotational information or the temporal information, and the input field 32 for specifying whether to display information in a time-series format (whether to display the elapsed time) as scale display of the horizontal axis.

Entering a check mark in the input field 32 causes the elapsed time to be displayed on the horizontal axis, and taking the check mark off from the input field 32 causes the elapsed time to be removed from the horizontal axis. In the case where the elapsed time is displayed, the elapsed time is displayed on the horizontal axis together with the rotation angle of the main shaft.

The input field 33 has, for each section, a field for specifying an "input data type", a field for entering a "start point", a field for entering an "end point", a field for entering a "stroke", and a field for entering a type of a "cam curve".

The field for specifying an "input data type" refers to a field for specifying the state of the main shaft by a rotation angle or elapsed time of the main shaft. As described later, a "position" is specified in the "input data type" column in the case of specifying a rotation angle of the main shaft, while a "time" is specified in the case of specifying an elapsed time in that column.

In a case of specifying a "position" in the "input data type" column, the input fields for entering the start point and the end point of the main shaft each receive a rotation angle that is a position of the main shaft. For example, for a section whose section number is "No. 1", "0" is entered as the start point of the main shaft, and "90" is entered as the end point of the same. In the case where the "input data type" is the "position", the start point and the end point are specified in units of "degrees" representing an angle. Therefore, the "No.

1" section has 0 degrees entered as the start point of the main shaft, and has 90 degrees entered as the end point thereof.

FIG. 2 illustrates a case in which values from 0 degrees to 90 degrees are entered for the section "No. 1", values from 90 degrees to 180 degrees are entered for the section "No. 2", values from 180 degrees to 270 degrees are entered for the section "No. 3", and values from 270 degrees to 0 degrees (360 degrees) are entered for the section "No. 4".

The field for entering the "stroke" refers to a field for specifying a position (Y coordinate) of the end point of the driven device 24. Into the field for entering the "stroke", a proportion of a moving position of the driven device 24 to the maximum moving position of the driven device 24. The maximum moving position of the driven device 24 is +100% or −100%, and therefore the field for entering the "stroke" allows any value of a range from −100 to +100 to be inputted thereinto. Note that a position (in mm or inches) of actual movement or the like may also be specified in the field for entering the "stroke". The unit (%, inch, or the like) for the stroke and the amount of stroke are entered in the field for entering the "stroke". The control data generation device 10 displays a vertical axis for a graph representing the positioning control data based on the unit for the stroke and the amount of stroke which have been entered.

The field for entering the type of the "cam curve" refers to a field for specifying the type of the waveform 201 of the positioning control data. The field for entering the type of the "cam curve" allows "uniform acceleration", "constant speed", "fifth-order", "distorted trapezoid", and the like to be inputted therein as the type of the "cam curve". The "uniform acceleration" represents a uniform acceleration curve. The "constant speed" represents a constant speed curve. The "fifth-order" represents a fifth-order curve. The "distorted trapezoid" represents a distorted trapezoid curve.

Note that, instead of the one-cycle time, the rotational speed of the main shaft may be entered in the input field 31. The control data generation device 10 may calculate the rotational speed of the main shaft from the one-cycle time, or may calculate the one-cycle time from the rotational speed of the main shaft.

As information to be inputted to the input unit 11 by the user, item selection information that is information for selecting an item for which a numerical value or the like is entered within the display screen displayed by the display device 30. The item selection information is entered by selecting an item displayed in the display screen using a mouse.

The item selection information includes information on whether or not to apply an item displayed in the display screen, and information indicating that an item displayed in the display screen has been selected by the user as an object for a numerical value to be inputted. Examples of items displayed in the display screen include the input fields 31 to 33 and so on.

Entering a check mark in the input field 32 for a process of inputting the item selection information causes time-series display to be applied, the time-series display corresponding to the item in the input field 32. When an item displayed in the display screen is selected as an object for a numerical value to be inputted, a numerical value is entered by the user. For example, after the input field 33 is selected as the item selection information, rotational information or temporal information is entered in the input field 33. In addition, after the input field 31 is selected as the item selection information, the one-cycle time is entered in the input field 31.

Upon reception of the generation configuration information, the input unit 11 sends the generation configuration information to the computation unit 13. In addition, upon reception of the item selection information, the input unit 11 sends the item selection information to the computation unit 13.

The element selection switching unit 12 receives a type switching order that is an instruction to switch the type of information to be received in the input field 33. The type switching order is inputted by the user using a mouse or the like. The type switching order is an instruction that specifies whether the input field 33 is to receive rotational information or temporal information. In other words, the type switching order is an instruction to switch a manner of setting information for generating the positioning control data. The type switching order is either an order to switch from the rotational information to the temporal information, or an order to switch from the temporal information to the rotational information. In the case in which the type switching order specifies switching to the rotational information, the user specifies a "position" in the "input data type" column, and in the case in which the type switching order specifies switching to the temporal information, the user specifies a "time" in the "input data type" column.

Note that the position of the driven device 24 included in the rotational information and the position of the same in the temporal information are common with each other. Therefore, the type switching order can be said to be an order to specify whether the information to be received be a rotation angle of the main shaft or an elapsed time. In the following description, information on the position of the driven device 24 of the rotational information may be omitted case by case, and partial description may be given on the premise that the rotational information is information on the rotation angle of the main shaft, in description of the rotational information. Besides, in the following description, information on the position of the driven device 24 of the lapse information may be omitted case by case, and partial description may be given on the premise that the lapse information is information on the elapsed time, in description of the lapse information.

The type switching order is set to allow specifying a section, whereby rotational information or temporal information can be specified on a per-section basis. The element selection switching unit 12 sends a type switching order specifying a rotation angle of the main shaft or a type switching order specifying an elapsed time, to the computation unit 13.

Upon reception of the type switching order, the computation unit 13 changes the type of information to be received. In the case of reception of a type switching order specifying a rotation angle of the main shaft, the computation unit 13 is set to receive a rotation angle of the main shaft. Alternatively, in the case of reception of a type switching order specifying an elapsed time, the computation unit 13 is set to receive an elapsed time. Thus, the computation unit 13 sets the type of the information to be received to a rotation angle of the main shaft or an elapsed time on the basis of the type switching order.

When a setting value is entered in the "start point" or "end point" column in the case in which the type of the information to be received is a rotation angle of the main shaft, the computation unit 13 determines that this setting value is information specifying a rotation angle of the main shaft, and receives the setting value as a rotation angle of the main shaft. Alternatively, when a setting value is entered in the "start point" or "end point" column in the case in which the type of the information to be received is the elapsed time, the computation unit 13 determines that this setting value is information specifying an elapsed time, and receives the setting value as an elapsed time.

The computation unit 13 calculates the waveform 201 of the positioning control data based on the rotational information or on the temporal information. In a case in which the user has entered rotational information including a rotation angle of the main shaft, the computation unit 13 calculates the waveform 201 of the positioning control data using the one-cycle time and the rotational information. Alternatively, in a case in which the user has entered temporal information including an elapsed time, the computation unit 13 calculates the waveform 201 of the positioning control data using the one-cycle time and the temporal information.

Specifically, the computation unit 13 calculates the waveform 201 of the positioning control data for each section based on the information entered in the "input data type", "start point", "end point", "stroke", and "cam curve" columns and on the one-cycle time. The computation unit 13 sets the horizontal axis to represent the rotation angle of the main shaft or the elapsed time, and sets the vertical axis to represent the position of the driven device 24 such as a turntable. The computation unit 13 sets the coordinates of the start point to be identical to the coordinates of the end point of the immediately previous section. The computation unit 13 sets, for example, coordinates (0, 0) for the start point of the section "No. 1". Note that the start point of the section "No. 1" may correspond to coordinates other than coordinates (0, 0).

In addition, the computation unit 13 sets the Y coordinate of the end point based on the stroke. The computation unit 13 sets the Y coordinate of the start point in rotation angle, but sets the Y coordinate of the start point in elapsed time in a case in which the "input data type" is a "time". Moreover, for the end point of a final section, the computation unit 13 sets coordinates (0, 0), for example. Note that the coordinates of the end point of the final section may correspond to coordinates other than coordinates (0, 0).

The computation unit 13 connects the start point and the end point of each section using a cam curve of the specified type. When the "input data type" is a "position", the computation unit 13 calculates the waveform in each section based on the one-cycle time and the type of a cam curve.

Upon reception of a type switching order after the rotation angle or the elapsed time is set, the computation unit 13 switches between the rotation angle and the elapsed time. That is, when a type switching order is received while the rotation angle of the main shaft is displayed, the computation unit 13 converts the rotation angle of the main shaft into the elapsed time. Alternatively, when a type switching order is received while the elapsed time is displayed, the computation unit 13 converts the elapsed time into the rotation angle of the main shaft. As described above, the computation unit 13 has a function of interconverting between a rotation angle of the main shaft and an elapsed time.

For example, when the one-cycle time is 60 seconds, rotation of the main shaft of 360 degrees requires 60 seconds. Assuming that the main shaft rotates at a constant speed, the rotation angle of the main shaft per unit time is constant. The computation unit 13 utilizes the fact that the rotation angle of the main shaft and the elapsed time has a proportional relation, to interconvert between the rotation angle of the main shaft and the elapsed time based on the one-cycle time. Note that when the input unit 11 has received the rotational speed of the main shaft from the user instead of the one-cycle time, the computation unit 13 calculates the one-cycle time based on the rotational speed of the main shaft, and then interconverts between the rotation angle of the main shaft and the elapsed time using the one-cycle time.

In addition, upon reception of a numerical value for an item specified in the item selection information, the computation unit 13 sets the received numerical value in the item specified in the item selection information. For example, upon reception of a numerical value when the input field 31 is specified in the item selection information, the computation unit 13 sets the received numerical value as the one-cycle time. In addition, when a check mark is inputted in the input field 32 as the item selection information, the computation unit 13 sends, to the display control unit 15, an order to display the elapsed time on the horizontal axis of the graph depicting the positioning control data. In this case, the computation unit 13 may send, to the display control unit 15, an order to display the rotation angle and the elapsed time during one revolution of the main shaft in arrangement of two rows for the scale of the horizontal axis of the graph depicting the positioning control data.

The computation unit 13 stores, in the computation result storage unit 14, the generation configuration information that has been inputted from the user, the waveform 201 calculated of the positioning control data, the rotation angle of the main shaft obtained by the conversion, the elapsed time obtained by the conversion, the content of the item selection information, and the numerical value(s) set for the item selection information.

The computation result storage unit 14 corresponds to a memory or the like used to store the generation configuration information, the waveform 201 of the positioning control data, the rotation angle of the main shaft obtained by the conversion, the elapsed time obtained by the conversion, the content of the item selection information, and the numerical value(s) set for the item selection information.

The display content switching unit 16 receives a display switching order that is an instruction to switch a displayed content of the positioning control data. The display switching order is inputted by the user using a mouse or the like on the display screen that is currently displayed in the display device 30. The display switching order is an instruction that specifies whether or not to display the speed, the acceleration, and the jerk for the positioning control data. Jerk is a derivative of acceleration. The display content switching unit 16 sends the display switching order to the display control unit 15.

The display control unit 15 graphically displays information stored in the computation result storage unit 14 on the display device 30. The display control unit 15 generates display screen data using data for displaying the display screen, and displays information stored in the computation result storage unit 14 on this display screen. The display control unit 15 displays the waveform 201 of the positioning control data on the display screen, and also displays the rotation angle of the main shaft (rotation angle of the main shaft that has been set by the user) used for calculation of the waveform 201 of the positioning control data, on the display screen. In addition, when the rotation angle of the main shaft and the elapsed time have been interconverted from one to the other, the display control unit 15 displays the rotation angle of the main shaft obtained by the conversion or the elapsed time obtained by the conversion, on the display screen. Moreover, the display control unit 15 displays the content of the item selection information and the numerical value(s) set for the item selection information, on the display screen.

In addition, upon reception of an order to display the elapsed time from the computation unit 13, the display control unit 15 displays the elapsed time on the horizontal axis of the graph displayed on the display screen. Moreover, upon reception of a display switching order from the display content switching unit 16, the display control unit 15 switches the content of display of the positioning control data. The display control unit 15 switches between displaying and not displaying each of the positioning control data, the speed, the acceleration, and the jerk.

As described above, the computation unit 13 displays information on the display screen via the display control unit 15. Note that the following description may omit partial description of processing performed by the display control unit 15 in describing a process in which the display control unit 15 displays information on the display screen by the computation unit 13 sending an order to display information to the display control unit 15. That is, a process in which the display control unit 15 displays the information on the display screen according to the order from the computation unit 13 may be described as a process in which the computation unit 13 displays the information on the display screen.

Figure 3:
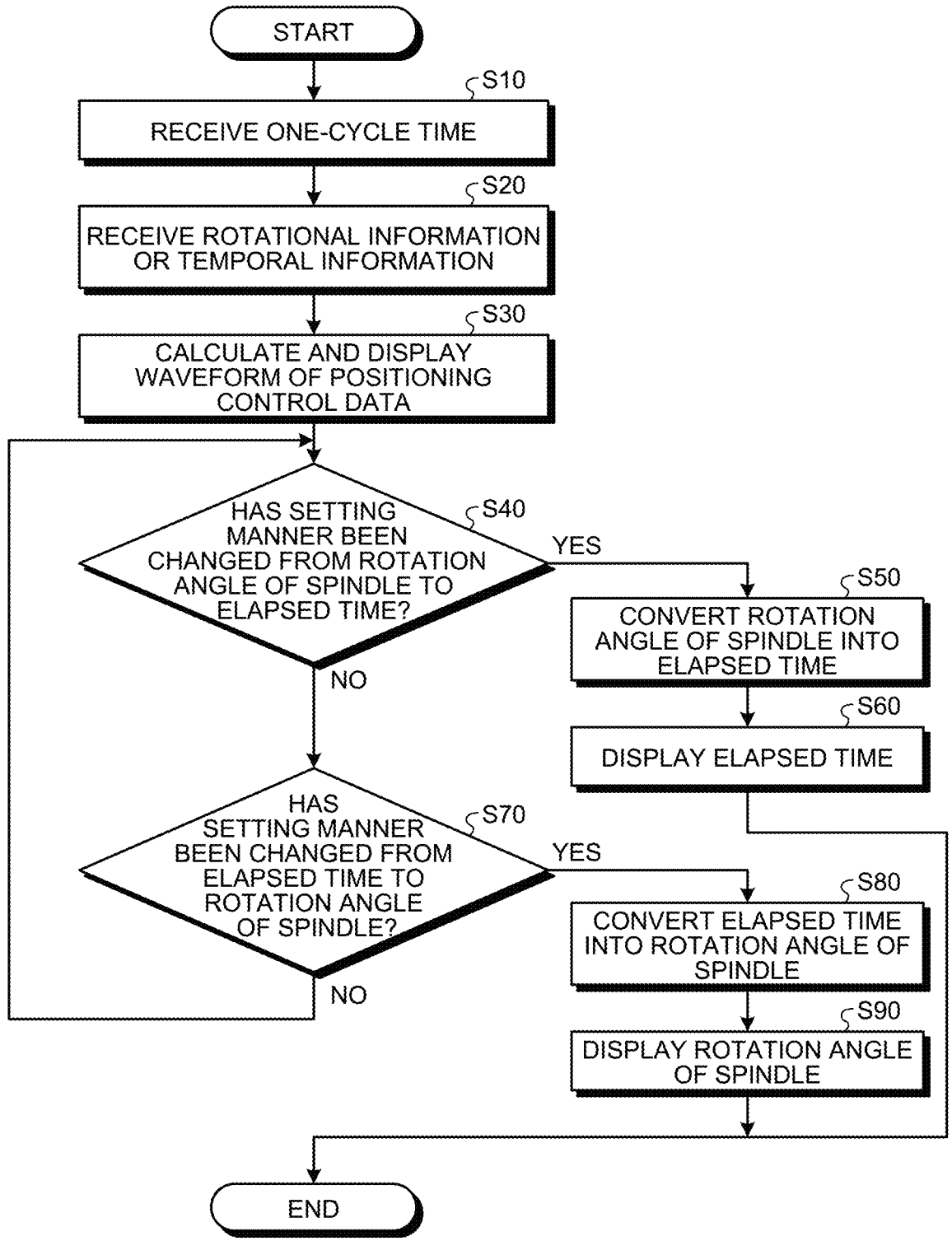
FIG. 3 is a flowchart illustrating a processing procedure for generating positioning control data, performed by the control data generation device according to the embodiment.

FIG. 3 is a flowchart illustrating a processing procedure for generating the positioning control data, performed by the control data generation device according to the embodiment. The input unit 11 of the control data generation device 10 receives generation configuration information inputted from the user. Specifically, the input unit 11 of the control data generation device 10 receives the one-cycle time inputted from the user (step S10), and receives rotational information or temporal information inputted from the user (step S20).

The computation unit 13 calculates the waveform 201 of the positioning control data using the one-cycle time, and displays the waveform 201 (step S30). In the case where the rotational information (a rotation angle of the main shaft) is received by the input unit 11, the computation unit 13 calculates the waveform 201 of the positioning control data using the rotation angle of the main shaft and the one-cycle time. In the case where temporal information (an elapsed time) is received by the input unit 11, the computation unit 13 calculates the waveform 201 of the positioning control data using the elapsed time and the one-cycle time.

The computation unit 13 determines whether or not the manner of setting information for use in generating the positioning control data has been changed. That is, the computation unit 13 determines whether or not the manner of setting information for use in generating the positioning control data has been changed from use of a rotation angle of the main shaft to use of an elapsed time (step S40).

If the manner of setting information for use in generating the positioning control data has been changed from use of a rotation angle of the main shaft to use of an elapsed time (Yes at step S40), the computation unit 13 converts the rotation angle of the main shaft into the elapsed time (step S50). The elapsed time obtained by the conversion is stored in the computation result storage unit 14. The display control unit 15 reads the elapsed time obtained by the conversion, from the computation result storage unit 14, and causes the display device 30 to display the elapsed time (step S60).

If the manner of setting information for use in generating the positioning control data has not been changed from use of a rotation angle of the main shaft to use of an elapsed time (No at step S40), the computation unit 13 determines whether or not the manner of setting information for use in generating the positioning control data has been changed from use of an elapsed time to use of a rotation angle of the main shaft (step S70).

If the manner of setting information for use in generating the positioning control data has not been changed from use of an elapsed time to use of a rotation angle of the main shaft (No at step S70), the process returns to step S40.

If the manner of setting information for use in generating the positioning control data has been changed from use of an elapsed time to use of a rotation angle of the main shaft (Yes at step S70), the computation unit 13 converts the elapsed time into the rotation angle of the main shaft (step S80). The rotation angle of the main shaft obtained by the conversion is stored in the computation result storage unit 14. The display control unit 15 reads the rotation angle of the main shaft obtained by the conversion, from the computation result storage unit 14, and displays the rotation angle of the main shaft read, on the display device 30 (step S90). Note that the computation unit 13 may perform the processing of step S70 prior to step S40.

Figure 4:
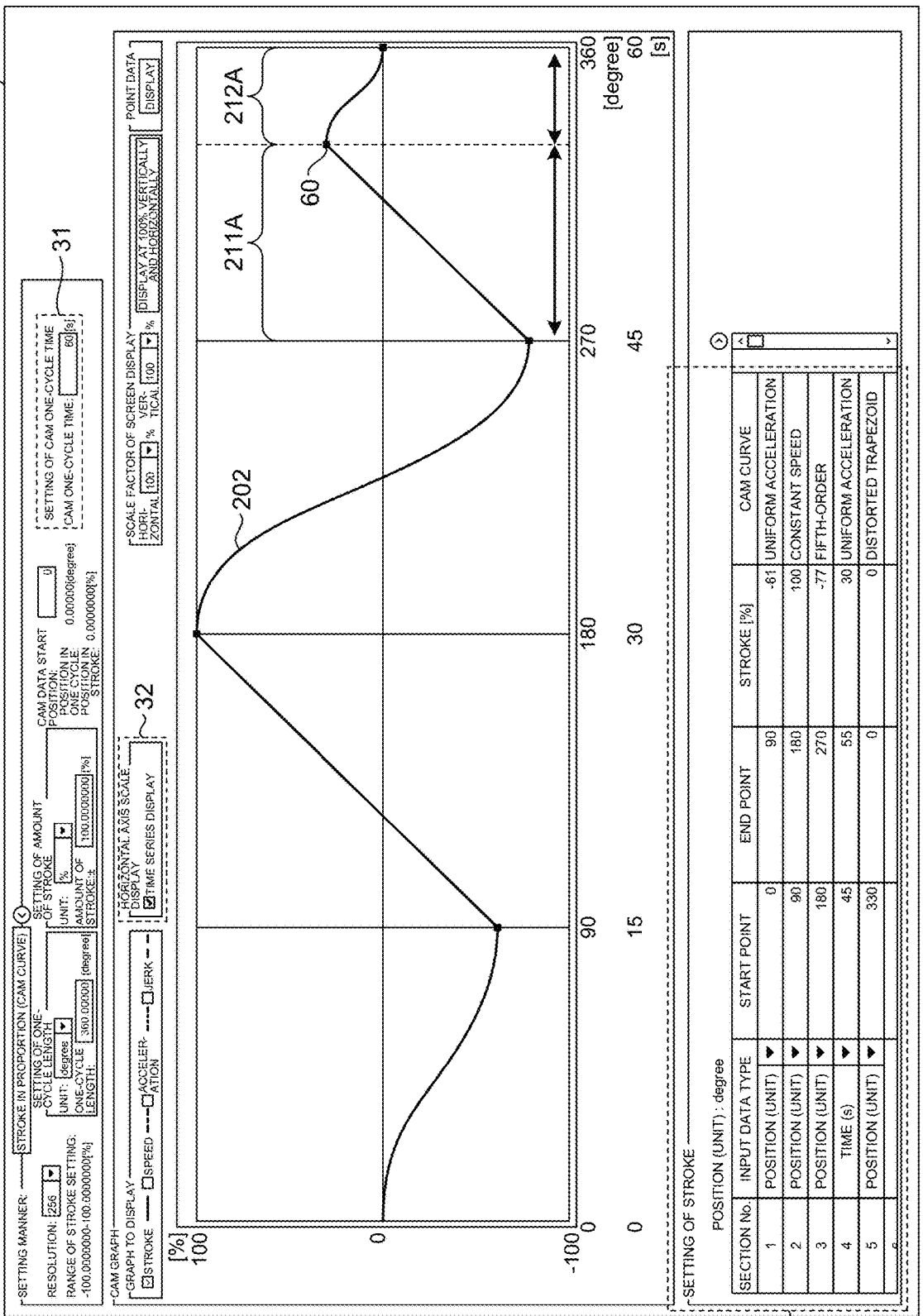
FIG. 4 is a diagram illustrating a second example of the positioning control data displayed by the control data generation device according to the embodiment.

FIG. 4 is a diagram illustrating a second example of the positioning control data displayed by the control data generation device according to the embodiment. FIG. 4 illustrates a screen 102 in a case in which any one of the sections of the graph depicting the positioning control data has been divided. The screen 102 illustrates the waveform of the positioning control data by a waveform 202.

When the user makes a check mark in the input field 32, the input unit 11 receives item selection information indicating that the user has selected the input field 32, and then sends the item selection information to the computation unit 13. The computation unit 13 sends, to the display control unit 15, an order to display the elapsed time on the horizontal axis of the graph displaying the positioning control data. FIG. 4 illustrates a case in which the computation unit 13 sends, to the display control unit 15, an order to display the rotation angle of the main shaft and the elapsed time in arrangement of two rows for the scale of the horizontal axis of the graph depicting the positioning control data, and the display control unit 15 displays the rotation angle and the elapsed time during one revolution of the main shaft in arrangement of two rows on the scale of the horizontal axis. The screen 102 displays an elapsed time of 0 seconds at the point where the rotation angle is 0 degrees, and displays an elapsed time of 60 seconds at the point where the rotation angle is 360 degrees. The screen 102 also displays an elapsed time of 15 seconds at the point where the rotation angle is 90 degrees, displays an elapsed time of 30 seconds at the point where the rotation angle is 180 degrees, and displays an elapsed time of 45 seconds at the point where the rotation angle is 270 degrees.

In addition, clicking on any point on the waveform 201 in the screen 101 of FIG. 2 causes the computation unit 13 to set the clicked point as a new start point. FIG. 4 illustrates a case in which the position of a point 60 has been specified as a position on the waveform 202, where the point 60 exists in a section from 270 degrees to 360 degrees (section "No. 4") of the rotation angle of the main shaft. In this case, the computation unit 13 divides the section from the rotation angles of the main shaft of 270 degrees to 360 degrees with the position of the point 60 being used as a boundary of the division. The computation unit 13 then sets a portion from the position corresponding to a rotation angle of the main shaft of 270 degrees to the position of the point 60 as a section of "No. 4", and sets a portion from the position of the point 60 to the position corresponding to a rotation angle of the main shaft of 360 degrees as a section of "No. 5". In short, the computation unit 13 divides the section "No. 4" into a new section "No. 4" and a new section "No. 5". Note that when the section "No. 1" is to be divided, the computation unit 13 divides the section "No. 1" into a new section "No. 1" and a new section "No. 2", and each of the section numbers of the original section "No. 2" and the later sections is increased by one.

In addition, the computation unit 13 sets input fields for entering generation configuration information for the new section "No. 4" and the new section "No. 5" in the input field 33, and displays the input field set thereby, on the screen 102. Assuming that the position of the point 60 is a point of 330 degrees, the computation unit 13 sets the start point of a new section of "No. 4" to 270 degrees, sets the end point thereof to 330 degrees, and then displays the rotation angle after the setting, on the screen 102. The computation unit 13 also sets the start point of a new section of "No. 5" to 330 degrees, sets the end point thereof to 0 degrees, and then displays the rotation angle after the setting, on the screen 102.

Selection of a cell of the "input data type" of the new section "No. 4" in the input field 33 using a mouse or the like allows the element selection switching unit 12 to receive a type switching order for the "input data type". Upon setting of the "input data type" cell to an "elapsed time" by a mouse or the like when a rotation angle of the main shaft is set in the "input data type" cell, the element selection switching unit 12 sends a type switching order specifying use of an elapsed time to the computation unit 13.

The computation unit 13 sets an "input data type" of the section "No. 4" to an elapsed time, and displays the input field 33 after the setting, on the screen 102. In this operation, the computation unit 13 converts the rotation angle of the main shaft into the elapsed time for the section "No. 4". Assume that the rotation angle of the main shaft of the section "No. 4" ranges from 270 degrees to 330 degrees. That is, assume that the rotation angle at the position of the point 60 is 330 degrees. In this case, the computation unit 13 converts the rotation angle of the main shaft of 270 degrees into an elapsed time of 45 seconds corresponding to the 270 degrees, and converts the rotation angle of the main shaft of 330 degrees into an elapsed time of 55 seconds corresponding to the 330 degrees. The computation unit 13 sets the elapsed time of 45 seconds as a "start point" of the section of "No. 4", sets the elapsed time of 55 seconds as an "end point" of the section of "No. 4", and displays the input field 33 after the setting, on the screen 102.

The user can change the elapsed times of 45 seconds and of 55 seconds by inputting new elapsed times in the input field 33. When an elapsed time of the section "No. 4" is changed, the computation unit 13 registers the elapsed time after the change, and displays the input field 33 after the change, on the screen 102.

When the user has changed setting of the "cam curve" of the section "No. 4", the computation unit 13 changes the setting of the "cam curve" for the section "No. 4", and displays the input field 33 after the change, on the screen 102. The screen 102 represents a case in which the setting of the "cam curve" for the section "No. 4" has been changed from a "distorted trapezoid" to a "uniform acceleration". When the setting of the "cam curve" is changed, the computation unit 13 modifies the waveform 202 to match the changed "cam curve".

When the user has inputted a value of the "stroke" for the section "No. 4", the computation unit 13 sets the inputted value for the "stroke", and displays the input field 33 after the setting, on the screen 102. The screen 102 represents a case in which the value of "stroke" for the section "No. 4" has been set to "30". When the value of "stroke" is changed, the computation unit 13 modifies the waveform 202 to match the changed "stroke". The graph in the screen 102 indicates the new section of "No. 4" as a section 211A, and indicates the new section of "No. 5" as a section 212A.

In addition, the user can input a section division order with respect to the input field 33 currently displayed on the screen 101 of FIG. 2. For example, inputting a division order for the section "No. 4" in the input field 33 allows the computation unit 13 to divide a row of the section "No. 4" in the input field 33 into a row of a section "No. 4" and another row of a section "No. 5". In this case, the computation unit 13 divides, for example, the section "No. 4" ranging from 270 degrees to 360 degrees into a new section of "No. 4" ranging from 270 degrees to an indefinite angle (blank) and another new section of "No. 5" ranging from an indefinite angle (blank) to 360 degrees. Then, when the rotation angle at the end point of the section "No. 4" is changed by the user, the computation unit 13 modifies the section of "No. 5" such that the rotation angle at the start point for the section "No. 5" coincides with the rotation angle at the end point for the section "No. 4".

Moreover, when the elapsed time at the end point for the section "No. 4" is changed by the user in the case where the "input data type" for the section "No. 4" has been changed to an elapsed time, the computation unit 13 modifies the section "No. 5" to match the rotation angle at the start point for the section "No. 5" with the point corresponding to the elapsed time at the end point for the section "No. 4".

Figure 5:
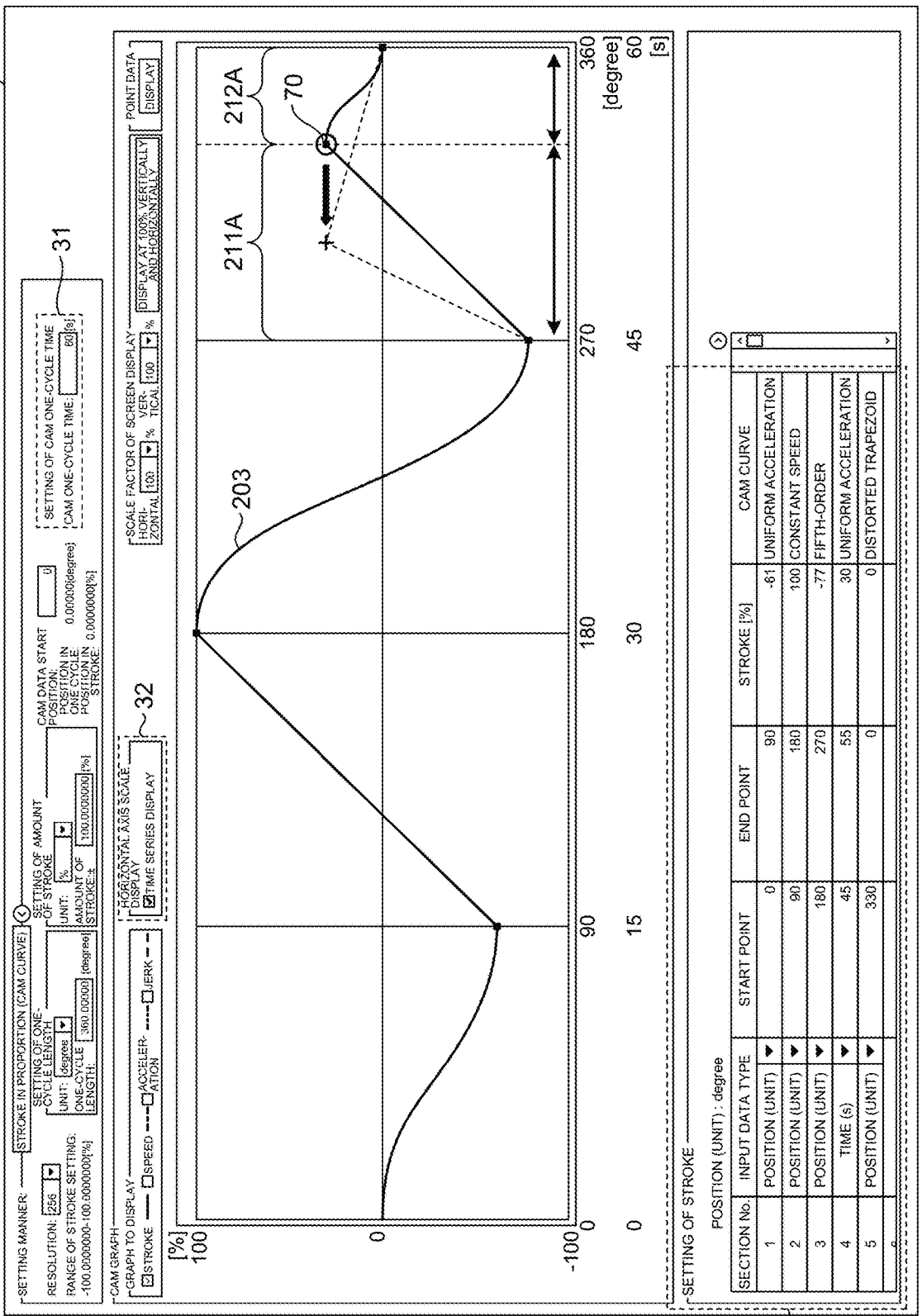
FIG. 5 is a diagram illustrating a third example of the positioning control data displayed by the control data generation device according to the embodiment.

FIG. 5 is a diagram illustrating a third example of the positioning control data displayed by the control data generation device according to the embodiment. FIG. 5 illustrates a screen 103 in a situation where a certain point on the waveform representing the positioning control data is moved. The screen 103 displays the waveform of the positioning control data to be displayed using a waveform 203.

The user can specify a point on the waveform 203 using a mouse or the like with respect to the waveform 203 being displayed on the screen 103. FIG. 5 illustrates a case of specification of the position of a point 70 on the waveform 203 in a section of "No. 4" of the waveform 203. In the example of FIG. 5, the section 211A and the section 212A of the waveform 203 border each other at the position of the point 70. The point 70 specified is movable with being dragged within the screen 103.

Figure 6:
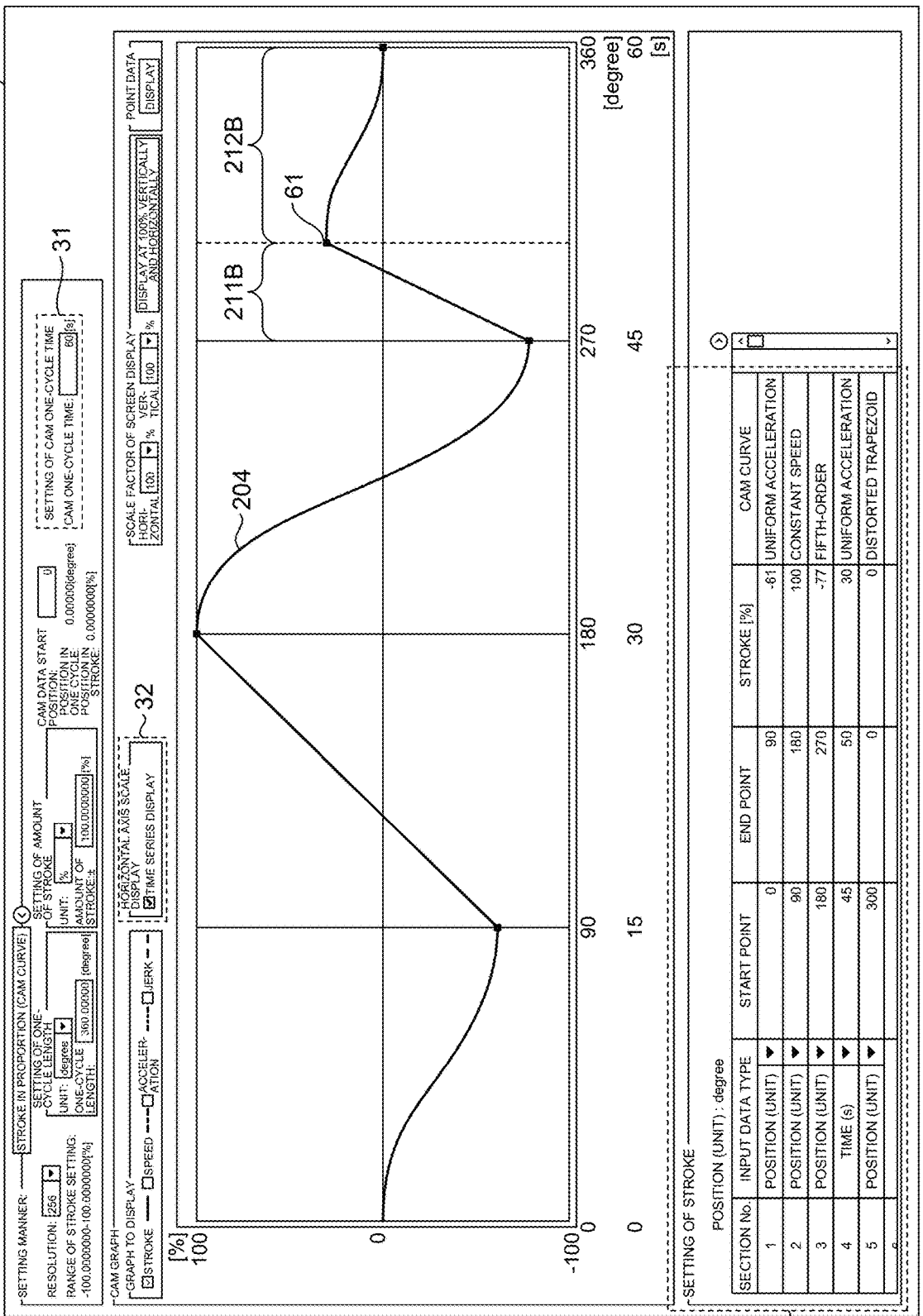
FIG. 6 is a diagram illustrating a fourth example of the positioning control data displayed by the control data generation device according to the embodiment.

FIG. 6 is a diagram illustrating a fourth example of the positioning control data displayed by the control data generation device according to the embodiment. FIG. 6 illustrates a screen 104 after movement of the position of the point 70 on the waveform 203 illustrated in FIG. 5. The screen 104 represents the waveform of the positioning control data to be displayed using a waveform 204.

Dropping of the dragged point 70 allows the computation unit 13 to change the dropped position to a point 61 on the waveform 204. By doing so, the computation unit 13 modifies the section 211A of the waveform 203 to a section 211B of the waveform 204, and modifies the section 212A of the waveform 203 to a section 212B of the waveform 204. That is, the section of "No. 4" is modified from the section 211A to the section 211B, and the section of "No. 5" is modified from the section 212A to the section 212B. The position of the point 61 corresponds to a boundary between the section 211B and the section 212B.

Assume that the position of the point 61 on the waveform 204 corresponds to an elapsed time of 50 seconds. In this case, the computation unit 13 maintains the start point for the section "No. 4" in the input field 33 at 45 seconds, and changes the value of the end point from 55 seconds to 50 seconds. In addition, the computation unit 13 sets the start point for the section "No. 5" in the input field 33 to a value equivalent to the value of the end point for the section "No. 4". Because the end point for the section "No. 4" corresponds to the elapsed time of 50 seconds, the computation unit 13 sets a rotation angle of 300 degrees corresponding to the elapsed time of 50 seconds as the value of the start point for the section "No. 5". The computation unit 13 displays the input field 33 after the setting, on the screen 104.

Figure 7:
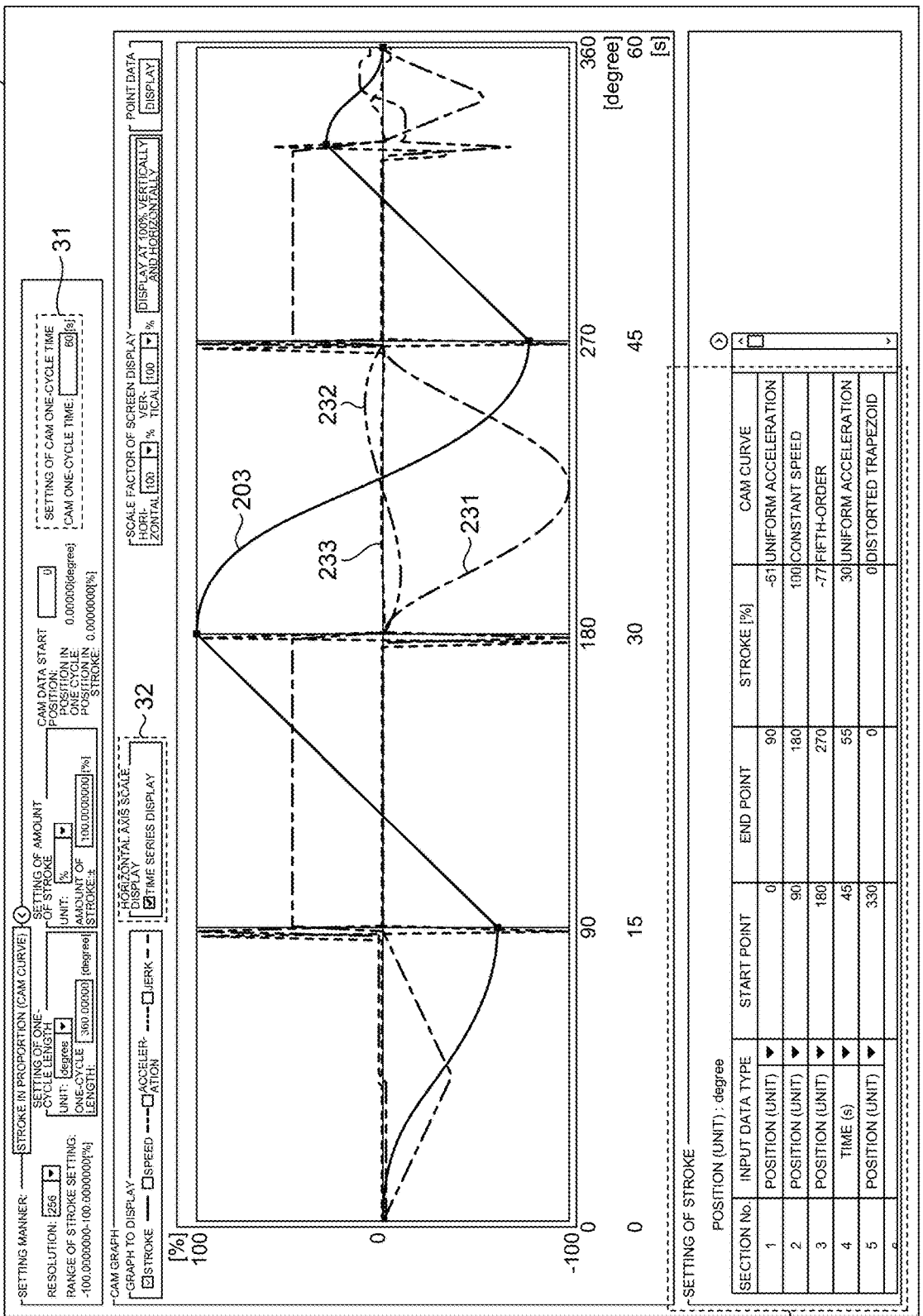
FIG. 7 is a diagram illustrating a fifth example of the positioning control data displayed by the control data generation device according to the embodiment.

FIG. 7 is a diagram illustrating a fifth example of the positioning control data displayed by the control data generation device according to the embodiment. FIG. 7 illustrates a screen 105 that displays data such as a speed calculated from the positioning control data. In FIG. 7, the waveform of the positioning control data displayed by the screen 105 is represented by the waveform 203 similarly to FIG. 5.

When a display switching order is received by the display content switching unit 16, the computation unit 13 calculates data specified in the display switching order, based on the waveform 203.

In a case in which the display switching order specifies display of a speed, the computation unit 13 differentiates the waveform 203 of the positioning control data to thereby calculate the waveform of speed data corresponding to the positioning control data. The screen 105 displays the waveform of speed data corresponding to the positioning control data by a waveform 231.

In a case in which the display switching order specifies display of an acceleration, the computation unit 13 differentiates the waveform 231 of speed data to thereby calculate the waveform of acceleration data corresponding to the positioning control data. The screen 105 displays the waveform of acceleration data corresponding to the positioning control data by a waveform 232. Note that the computation unit 13 may calculate the waveform of acceleration data corresponding to the positioning control data by differentiating twice the waveform 203 of the positioning control data.

In a case in which the display switching order specifies display of jerk, the computation unit 13 differentiates the waveform 232 of the acceleration data to thereby calculate the waveform of jerk data corresponding to the positioning control data. The screen 105 displays the waveform of the jerk data corresponding to the positioning control data by a waveform 233. Note that the computation unit 13 may calculate the waveform of the jerk data corresponding to the positioning control data by differentiating three times the waveform 203 of the positioning control data, or may calculate the waveform of the jerk data corresponding to the positioning control data by differentiating twice the waveform 231 of the speed data.

The control data generation device 10 is capable of displaying the waveform 203 of the positioning control data, the waveform 231 of the speed data, the waveform 232 of the acceleration data, and the waveform 233 of the jerk data all together in a single plot area. In other words, the display control unit 15 is capable of displaying the waveform 203 of the positioning control data, the waveform 231 of the speed data, the waveform 232 of the acceleration data, and the waveform 233 of the jerk data at one time in the form of a composite graph.

Figure 8:
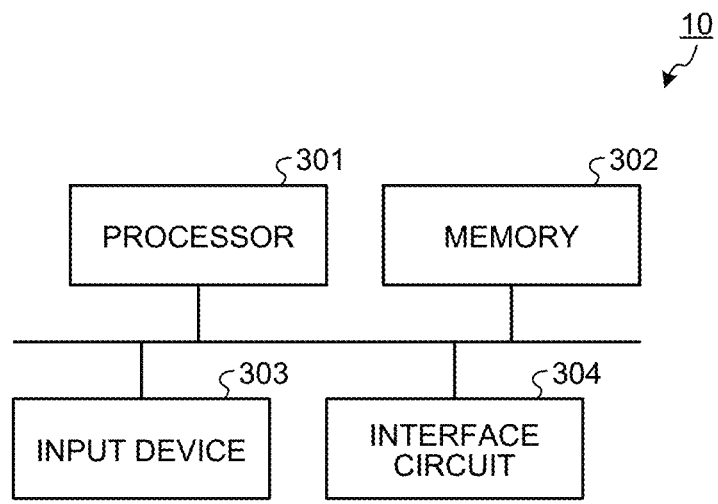
FIG. 8 is a diagram illustrating a hardware configuration by which the control data generation device according to the embodiment is implemented.

A hardware configuration of the control data generation device 10 will now be described. FIG. 8 is a diagram illustrating a hardware configuration by which the control data generation device according to the embodiment is implemented. The control data generation device 10 is implemented by a processor 301, a memory 302, an input device 303, and an interface circuit 304. The processor 301 controls the memory 302, the input device 303, and the interface circuit 304. Examples of the input device 303 include a mouse and a keyboard. The input device 303 receives an order from the user, and inputs the order into the processor 301. The interface circuit 304 outputs a result of data processing performed by the processor 301 to the display device 30.

Examples of the processor 301 include a central processing unit CPU (also known as a central processing unit, a central processing device, a processing device, a computing device, a microprocessor, a microcomputer, a processor, and a digital signal processor (DSP)) and a system large scale integration (LSI) circuit. Examples of the memory 302 include a random access memory (RAM) and a read-only memory (ROM).

The input unit 11, the element selection switching unit 12, and the display content switching unit 16 are implemented using the input device 303. The computation unit 13, the computation result storage unit 14, and the display control unit 15 are implemented using the processor 301 and the memory 302. The communication between the computation result storage unit 14 and the controller 21 is provided using the interface circuit 304.

The control data generation device 10 is implemented by the processor 301 reading and executing a program stored in the memory 302 for performing operations of the control data generation device 10. It can also be said that this program is a means of causing a computer to carry out a procedure or method for the control data generation device 10. The memory 302 is also used as a temporary memory for the processor 301 to perform various kinds of processing tasks.

A program executed by the processor 301 may be a computer program product having a computer-readable non-transitory recording medium including multiple computer-executable instructions for performing data processing. A program executed by the processor 301 is configured with multiple instructions causing a computer to perform the data processing.

Alternatively, the control data generation device 10 may be implemented in a dedicated hardware set. In addition, functions for the control data generation device 10 may be implemented partially by dedicated hardware and the remainder partially in software or firmware.

Conventionally, lack of functionality of interconversion between a rotation angle of the spindle and an elapsed time have required a user to manually calculate the elapsed time using the positioning control data in order to obtain the elapsed time in the course of an operation from the positioning control data generated based on the rotation angle.

In addition, for generation of a mechanical cam pattern (operational pattern of a turntable or the like) with respect to the rotation angle of the spindle, a graph is generated having a horizontal axis representing the rotation angle of the spindle and a vertical axis representing the moving position of the mechanical cam. Due to the horizontal axis being provided in a unit system for the spindle, it has been difficult to set a moving position of the mechanical cam after a lapse of a certain time period, from a specific rotation angle of the spindle.

Lack of functionality of interconversion between a rotation angle of the spindle and an elapsed time is not able to make re-editing in such a way as to change the rotation angle of the spindle and the elapsed time for each section after the positioning control data is finished to be generated for all the sections. For this reason, it is not possible to display contents of setting with any one of a rotation angle of the spindle and an elapsed time of the operation being selected for each section.

In contrast, the control data generation device 10 according to the embodiment is equipped with an interface to receive the one-cycle time of the driven device 24, and so capable of calculating the elapsed time in the course of the operation of the driven device 24 using the one-cycle time. This enables the user to check the elapsed time in the course of an operation of the driven device 24 without performing manual calculation. Moreover, since the moving position of the driven device 24 at a specific time after a time point in the process of an operation in one cycle can be easily set, the efficiency of generation of the positioning control data is improved.

Furthermore, since graphically displaying and setting the positioning control data can be realized, it is possible to intuitively see the elapsed time of the driven device 24 during one cycle of the main shaft or spindle. In addition, the speed data, acceleration data, and jerk data can be displayed at one time in the form of waveforms in the same type of time-series graph. Therefore, it is possible to easily see the relationships among the sets of waveform data, thereby enabling the motor 23 that is a drive device to be mechanically adjusted with higher efficiency.

As described above, upon reception of an order to display temporal information when rotational information is displayed, the control data generation device 10 according to the embodiment converts the rotational information into temporal information, and then displays the temporal information obtained by the conversion on the display device 30. In addition, upon reception of an order to display rotational information when temporal information is displayed, the control data generation device 10 converts the temporal information into rotational information, and then displays the rotational information obtained by the conversion on the display device 30. This enables the user to easily check the rotation angle of the main shaft or spindle at a position in the process of an operation and the elapsed time in the course of the operation. Therefore, the positioning control data can be edited in an easier manner.

The configurations described in the foregoing embodiment are merely examples of the contents of the present invention, and can each be combined with other publicly known techniques and partially omitted and/or modified without departing from the scope of the present invention.

REFERENCE SIGNS LIST 10 control data generation device; 11 input unit; 12 element selection switching unit; 13 computation unit; 14 computation result storage unit; 15 display control unit; 16 display content switching unit; 21 controller; 22, 25 servo amplifier; 23 motor; 24 driven device; 26 spindle motor; 30 display device; 31-33 input field; 60, 61, 70 point; 101-105 screen; 201-204, 231-233 waveform; 211A, 211B, 212A, 212B section; 301 processor; 302 memory; 303 input device; 304 interface circuit.

The invention claimed is:

1. A control data generation device for generating a control command for providing positioning control of a driven device to be driven by a drive device to a position corresponding to a periodic operation of a main shaft that is a rotation axis, the control data generation device comprising:

an input unit to receive one of rotational information and temporal information, the rotation information having specified therein a correspondence relationship between a specific rotation angle or a specific rotational position during one revolution of the main shaft and a position of the driven device, the temporal information having specified therein a correspondence relationship between a specific elapsed time during one revolution of the main shaft and the position of the driven device;

a computation unit to calculate the control command based on the rotational information or on the temporal information; and a display control unit to display the control command calculated by the computation unit on a display device, wherein in response to an order to display the other one of the rotational information and the temporal information when the display device is displaying the one of the rotational information and the temporal information, the computation unit converts the one of the rotational information and the temporal information into the other one of the rotational information and the temporal information.

2. The control data generation device according to claim 1, wherein the computation unit generates a waveform of the control command with a specific rotation angle or a specific rotational position during one revolution of the main shaft being used for a horizontal axis and with a position of the driven device being used for a vertical axis, and the display control unit causes the display device to display the waveform of the control command.

3. The control data generation device according to claim 2, wherein in response to the input unit receiving an order to display an elapsed time during one revolution of the main shaft on the horizontal axis, the display control unit causes the display device to display the horizontal axis in which the elapsed time during one revolution of the main shaft is set.

4. The control data generation device according to claim 3, wherein the display control unit provides control of displaying the specific rotation angle or the specific rotational position during one revolution of the main shaft and the elapsed time during one revolution of the main shaft in arrangement of two rows for a scale of the horizontal axis.

5. The control data generation device according to claim 1, wherein a range corresponding to one revolution of the main shaft is divided into two or more sections, and the computation unit generates the control command for each of the sections, and in a case of converting the rotational information into the temporal information, the computation unit converts the rotational information into the temporal information for each of the sections, but in a case of converting the temporal information into the rotational information, the computation unit converts the temporal information into the rotational information for each of the sections.

6. The control data generation device according to claim 2, wherein in response to a point on the waveform of the control command being moved according to an order from a user when the display device is displaying the temporal information, the computation unit calculates temporal information corresponding to a position of a resulting point after the movement, and modifies the waveform of the control command to a waveform passing through the resulting point after the movement, and the display control unit provides control of displaying the waveform modified and the temporal information calculated, on the display device, and in response to a point on the waveform of the control command being moved according to an order from the user when the display device is displaying the rotational information, the computation unit calculates rotational information corresponding to a position of a resulting point after the movement, and modifies the waveform of the control command to a waveform passing through the resulting point after the movement, and the display control unit provides control of displaying the waveform modified and the rotational information calculated, on the display device.

7. The control data generation device according to claim 1, wherein
in response to the input unit receiving a display order to display a speed, an acceleration, or a jerk,
the computation unit calculates a waveform of the speed, the acceleration, or the jerk specified by the display order, based on the control command, and
the display control unit displays the waveform of the control command and a waveform of the speed, the acceleration, or the jerk calculated by the computation unit together in a single plot area.

8. The control data generation device according to claim 1, wherein
the computation unit is configured to convert the one of the rotational information and the temporal information into the other one of the rotational information and the temporal information, based on a one-cycle time of the driven device by utilizing a proportional relation between the specific rotation angle of the main shaft and the specific elapsed time.

9. A control data generation method for generating a control command for providing positioning control of a driven device driven by a drive device to a position corresponding to a periodic operation of a main shaft that is a rotation axis, the control data generation method comprising:
an input step of receiving one of rotational information acid temporal information, the rotation information having specified therein a correspondence relationship between a specific rotation angle or a specific rotational position during one revolution of the main shaft and a position of the driven device, the temporal information having specified therein a correspondence relationship between a specific elapsed time during one revolution of the main shaft and the position of the driven device;
a computation step of calculating the control command based on the rotational information or on the temporal information;
a display step of displaying the control command calculated by the computation step on a display device; and
in response to an order to display the other one of the rotational information and the temporal information when the display device is displaying the one of the rotational information and the temporal information, converting the one of the rotational information and the temporal information into the other one of the rotational information and the temporal information.

10. The control data generation method according to claim 9, wherein
the computation step includes converting the one of the rotational information and the temporal information into the other one of the rotational information and the temporal information, based on a one-cycle time of the driven device by utilizing a proportional relation between the specific rotation angle of the main shaft and the specific elapsed time.

11. A non-transitory storage medium in which a control data generation program is stored, the program being configured to generate a control command for providing positioning control of a driven device driven by a drive device to a position corresponding to periodic operation of a main shaft that is a rotation axis, the control data generation program causing a computer to perform:
an input step of receiving one of rotational information and temporal information, the rotation information having specified therein a correspondence relationship between a specific rotation angle or a specific rotational position during one revolution of the main shaft and a position of the driven device, the temporal information having specified therein a correspondence relationship between a specific elapsed time during one revolution of the main shaft and the position of the driven device;
a computation step of calculating the control command based on the rotational information or on the temporal information; and
a display step of displaying the control command calculated by the computation step on a display device, wherein
upon receiving an order to display the other one of the rotational information and the temporal information when the display device is displaying the one of the rotational information and the temporal information, converting the one of the rotational information and the temporal information into the other one of the rotational information and the temporal formation.

12. The non-transitory storage medium according to claim 11, wherein
the computation step includes converting the one of the rotational information and the temporal information into the other one of the rotational information and the temporal information, based on a one-cycle time of the driven device by utilizing a proportional relation between the specific rotation angle of the main shaft and the specific elapsed time.

13. A control data generation device for generating a control command for providing positioning control of a driven device to be driven by a drive device to a position corresponding to a periodic operation of a main shaft that is a rotation axis, the control data generation device comprising:
a computation unit to calculate the control command based on one of rotational information or and temporal information, the rotational information having specified therein a correspondence relationship between a specific rotation angle or a specific rotational position during one revolution of the main shaft and a position of the driven device, the temporal information having specified therein a correspondence relationship between a specific elapsed time during one revolution of the main shaft and the position of the driven device; and
a display control unit to display the control command calculated by the computation unit on a display device, wherein
in response to an order to display the other one of the rotational information and the temporal information when the display device is displaying the one of the rotational information and the temporal information, the computation unit converts the one of the rotational information and the temporal information into the other one of the rotational information and the temporal information.

\* \* \* \* \*